(12) United States Patent
Sowa et al.

(10) Patent No.: US 7,854,146 B2
(45) Date of Patent: *Dec. 21, 2010

(54) METHOD FOR PRODUCTION OF AN OPTICAL COMPONENT FROM QUARTZ GLASS

(75) Inventors: Rene Sowa, Pouch (DE); Ralph Sattmann, Aschaffenburg (DE); Jan Vydra, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1289 days.

This patent is subject to a terminal disclaimer.

(21) Appl. No.: 10/565,099

(22) PCT Filed: Jul. 18, 2004

(86) PCT No.: PCT/EP2004/008033

§ 371 (c)(1),
(2), (4) Date: Jan. 18, 2006

(87) PCT Pub. No.: WO2005/009913

PCT Pub. Date: Feb. 3, 2005

(65) Prior Publication Data

US 2006/0207293 A1    Sep. 21, 2006

(30) Foreign Application Priority Data

Jul. 18, 2003   (DE) ................................ 103 33 059

(51) Int. Cl.
  *C03B 37/025* (2006.01)
(52) U.S. Cl. ..................................................... 65/412
(58) Field of Classification Search .............. 65/412
  See application file for complete search history.

(56) References Cited

U.S. PATENT DOCUMENTS

| | | | |
|---|---|---|---|
| 4,195,980 A * | 4/1980 | Sterling et al. | 65/392 |
| 4,812,154 A | 3/1989 | Yoshida | |
| 6,460,378 B1 | 10/2002 | Dong | |
| 6,584,808 B1 | 7/2003 | Roba | |
| 7,028,508 B2 * | 4/2006 | Fabian et al. | 65/414 |
| 2004/0206128 A1 * | 10/2004 | Zilnyk | 65/412 |
| 2005/0204780 A1 * | 9/2005 | Moridaira et al. | 65/407 |

FOREIGN PATENT DOCUMENTS

EP    1 129 999 A2    9/2001

* cited by examiner

*Primary Examiner*—Queenie Dehghan
(74) *Attorney, Agent, or Firm*—Tiajoloff and Kelly LLP

(57) ABSTRACT

The production of an optical component from quartz glass by elongation of a coaxial arrangement of a core rod and a hollow cylinder is known. The arrangement is thus introduced into a heating zone, such that the lower end begins to partly soften and the component drawn from the softened part. According to the invention, a pseudo-continuous method for the formation of the restriction in the inner passage of the hollow cylinder on which the core rod is supported, is disclosed, whereby an upper hollow cylinder is fused end on with a lower hollow cylinder to form an axial composite cylinder, a core rod is introduced into the lower hollow cylinder and the axial cylinder composite partly softened and elongated to form the optical component. A drawing bulb extending to the upper hollow cylinder forms, within which the inner passage at least partly collapses with formation of the restriction and the upper cylinder is then separated off from the drawn optical component at a separating plane and then elongated together with a core rod to form an optical component.

21 Claims, 4 Drawing Sheets

METHOD FOR PRODUCTION OF AN OPTICAL COMPONENT FROM QUARTZ GLASS

Figure 1:
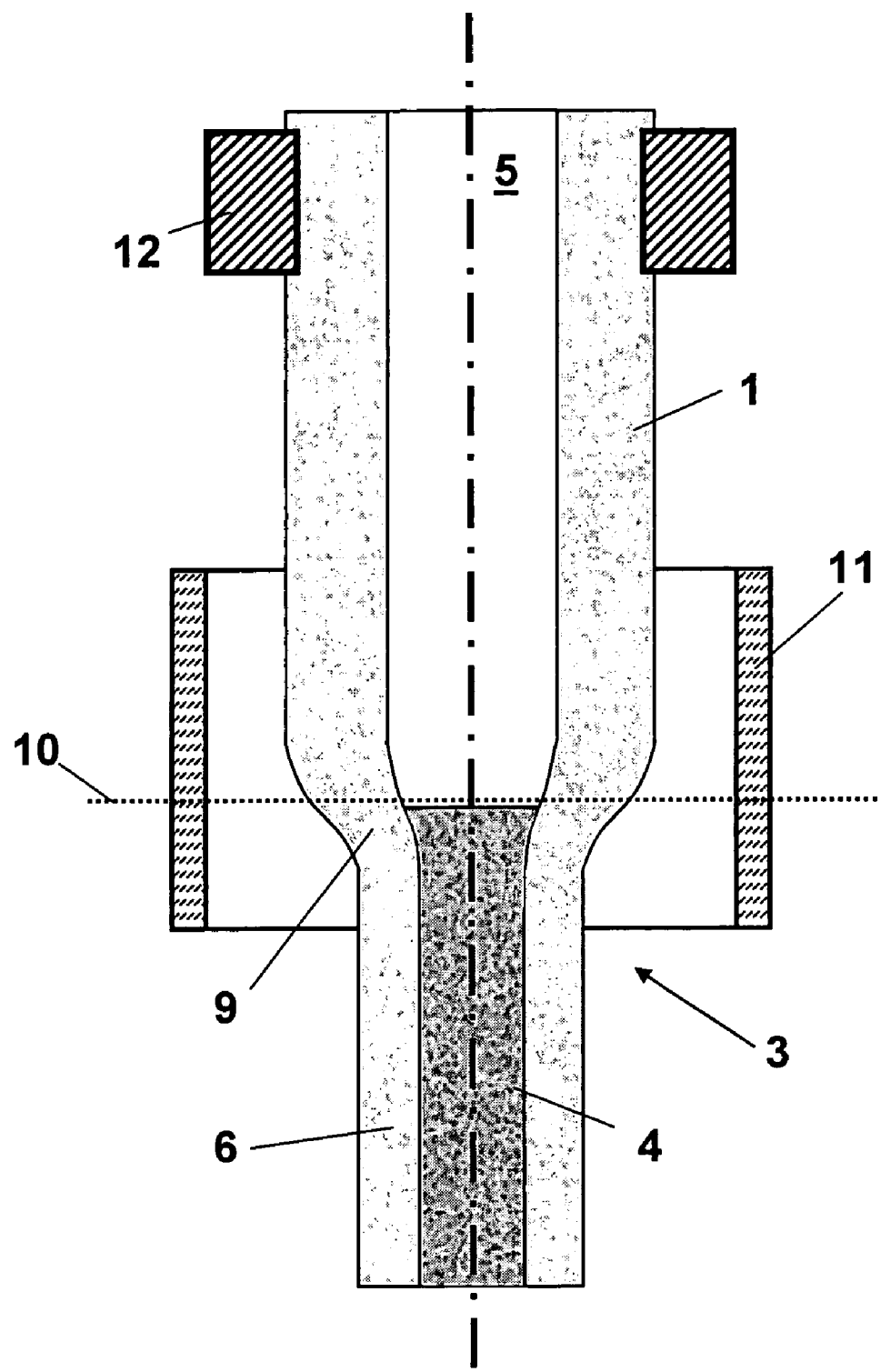

The present invention relates to a method for producing an optical component of quartz glass by elongating a coaxial arrangement of a core rod and a hollow cylinder of a predetermined length in that the coaxial arrangement is supplied in vertical orientation to a heating zone and is softened therein zonewise, starting with its lower end, and the component is drawn off downwards from the softened region, the hollow cylinder having an inner bore which in the region of its lower end is provided with a constriction on which the core rod is supported.

Simple solid cylinders or intermediate products (preforms) for optical fibers are produced by collapsing and elongating a coaxial arrangement consisting of core rod and of at least one hollow cylinder overcladding the core rod. It is also known that a hollow cylinder is collapsed onto a core rod during fiber drawing, the last-mentioned method being called "ODD (overclad-during-drawing) method". All of the method variants require an exact coaxial guidance or fixation of the core rod in the hollow cylinder.

To ensure this and to guarantee, in addition, a damage-free introduction of the core rod into a jacket tube, U.S. Pat. No. 4,812,154 A1 suggests a method for producing a preform in which in the lower region of the jacket tube a restriction is produced with an inner diameter smaller than the outer diameter of the core rod. The jacket tube is vertically oriented and a nitrogen stream is passed from the lower side through the jacket tube. At the same time, starting with its lower end, the core rod is introduced into the jacket tube in a direction opposite to the gas stream, whereby a centering of the core rod in the jacket tube, which prevents contact with the inner wall, is achieved by means of the gas stream. As soon as the lower and conically outwardly tapering end of the core rod comes to rest on the restriction of the jacket tube, core rod and jacket tube are fused with each other with formation of a preform.

It is suggested in another method according to EP 1 129 999 A2 that a core rod should be overclad with an inner cladding glass tube and an outer cladding glass tube at the same time. For fixing the core rod coaxially inside the inner and outer cladding glass tube, the outer cladding glass tube is provided in the region of the lower end with a restriction by way of heating. With a vertically oriented outer jacket tube a holding ring is introduced from above into the inner bore of the jacket tube, the ring having an outer diameter slightly larger than the diameter of the restriction, so that the holding ring comes to rest from above on the region of the restriction. With an exactly horizontal orientation, the middle bore of the holding ring yields a stop for the core rod provided with a conical lower end, whereas the first inner jacket tube is supported on the holding ring. Subsequently, the jacket tubes and the core rod are fused with each other, with a vacuum being produced and maintained in the inner bore of the outer jacket tube.

It is the object of the present invention to provide a further method for producing optical components of high quality by elongating a coaxial arrangement consisting of core rod and hollow cylinder, wherein for the purpose of fixing the core rod the hollow cylinder is provided with a constriction which can be produced at low costs and which permits a reproducible fixation of the core rod in the hollow cylinder with as little efforts as possible.

Starting from the above-mentioned method, this object is achieved according to the invention in that the constriction of the inner bore is produced in a first upper hollow cylinder, in that a) the first upper hollow cylinder is fused at the front side with a second lower hollow cylinder with formation of an axial cylinder composite,
b) a core rod is introduced into the lower hollow cylinder, and the axial cylinder composite is supplied to the heating zone, starting with its lower end, and is softened therein zonewise and elongated with formation of the optical component,
c) a drawing bulb being formed progressing in the cylinder composite to the first upper hollow cylinder, within which bulb the inner bore is collapsed at least in part and thereby produces the constriction of the inner bore,
d) the first hollow cylinder is separated at a separation plane in the area of the constriction from the withdrawn optical component and
e) is subsequently elongated for producing an optical component together with a core rod in a coaxial arrangement.

The quartz glass component is produced in that a core rod is introduced into the inner bore of the lower hollow cylinder. The coaxial arrangement of core rod and hollow cylinder is softened zonewise and elongated into a solid rod, a preform or into a fiber.

In contrast to the known methods, an optical component is drawn in the method of the invention in a first elongation process from the lower hollow cylinder with the core rod inserted therein, and the constriction is simultaneously produced at the upper hollow cylinder for holding the core rod for the subsequent elongation process.

To this end the upper hollow cylinder is fused to the upper side of the lower hollow cylinder before the first elongation process. The inner bore of the upper hollow cylinder can be collapsed freely at least in part. A core rod which can also project into the inner bore of the upper hollow cylinder is inserted into the inner bore of the lower hollow cylinder.

The composite consisting of first upper hollow cylinder and second lower hollow cylinder is supplied in vertical orientation to a heating zone and is softened therein zonewise, starting with its lower end, and elongated to obtain the optical component. This produces a taper of the outer diameter in the form of a drawing bulb, the inner bore of the lower hollow cylinder collapsing completely at the same time in that the annular gap closes between the core rod and the inner wall of the hollow cylinder is closed. Due to the continuous advance movement of the composite to a heating zone the drawing bulb gradually moves towards the upper hollow cylinder. At the latest when the drawing bulb has reached the welded-on upper hollow cylinder, the inner bore thereof also starts to collapse, i.e. the inner diameter tapers downwards, whereby the constriction is formed. The first upper hollow cylinder is separated from the withdrawn optical component or the rest thereof. Its inner bore is now collapsed completely or in part in the area of the separation plane, thus showing the desired constriction for the support of a core rod in a subsequent second elongation process.

In the second elongation process, the first hollow cylinder produced in this way, which comprises an inner bore with constriction, is elongated in a coaxial arrangement with a core rod to obtain an optical component. The core rod has been introduced through the upper opening of the inner bore of the hollow cylinder before.

This yields another advantage of the method of the invention. The advantage is that the lower end of the hollow cylinder is tapered downwards, thereby assuming the shape of a drawing bulb. This shape simplifies the pulling behavior in the second elongation process and reduces the loss of material in the so-called "tip-forming" process.

The core rod is a quartz glass rod with a radially homogeneous or radially inhomogeneous refractive index distribution. As a rule, the core rod consists of a core glass having a higher refractive index which is surrounded by a cladding glass having a lower refractive index. The core rod is made in one piece, or it is composed of a plurality of short core-rod pieces that are superposed one on top of the other in the inner bore of the hollow cylinder. The cladding glass is an integral component of the core rod, or it is provided fully or in part in the form of one or several cladding glass tubes surrounding a quartz glass rod. In the last-mentioned case, the core rod consists of a coaxial arrangement of a quartz glass rod or of one or several cladding glass tubes. In this case the outer diameter of the outer cladding glass tube shall here be understood as the outer diameter of the core rod.

The core rod in this sense is guided inside the inner bore of the lower hollow cylinder and is axially fixed by means of the constriction formed therein. The upper end of the core rod terminates in the area of the joint of upper and lower hollow cylinder or thereabove. The two hollow cylinders are made integral or are composed of several pieces.

The optical component is a solid rod, a preform for producing optical fibers, or an optical fiber.

Preferably, the first hollow cylinder is used in the second elongation process as the second hollow cylinder in the sense of the invention.

This means that the upper front side thereof has again welded thereto an upper hollow cylinder in the inner bore of which the constriction for holding a core rod is produced in the course of the second elongation process. This process can be repeated as often as desired. This is a quasi-continuous drawing method which comprises at least two elongation processes.

At the beginning of the quasi-continuous drawing method, in the first elongation process, the core rod is held in any desired manner in the lower hollow cylinder. In the subsequent elongation processes it will rest on a constriction of the inner bore of the hollow cylinder which has been produced in a preceding elongation process.

Preferably, the upper hollow cylinder is used in the elongation process for holding the lower hollow cylinder.

In this respect the upper hollow cylinder has the holding function which is normally assigned to a so-called "dummy cylinder" consisting of low-quality quartz glass, which is engaged by the holding device and which is used for avoiding losses of material due to incomplete elongation of the hollow cylinder and the core rod inserted therein. Such a dummy cylinder is here not needed.

However, it is also advantageous to weld a dummy cylinder to the upper hollow cylinder, the dummy cylinder being engaged by the holding device. The surface of the upper hollow cylinder is not damaged by mechanical gripper elements acting thereon.

It has turned out to be advantageous when the constriction in the area of the separation plane has an axially continuous opening.

The remaining opening of the inner bore simplifies the cleaning of the hollow cylinder before the next elongation process and it permits gas flushing at the beginning of the elongation process. The separation plane is here chosen in the area of the drawing bulb such that the inner bore of the separated hollow cylinder shows the desired constriction at said place on the one hand, but is not completely collapsed yet on the other hand. The inner diameter of the constriction is smaller than the outer diameter of the core rod resting thereon in the subsequent elongation process.

An annular gap which is still open is found between the inner wall of the inner bore and the core rod/holding rod in the case of a core rod or holding rod inserted into the inner bore. The term "inner bore" shall be understood in the following explanations such that "an inner bore in the form of an annular gap of such a type" is also to be comprised although an "annular gap" is not explicitly mentioned.

In a particularly preferred procedure, the elongation process comprises a drawing phase and a drawing end phase, a vacuum as compared with the externally applied pressure being produced in the inner bore during the drawing phase.

In the drawing phase of the elongation process, a vacuum in comparison with the externally applied pressure is produced at least temporarily in the inner bore and is maintained there. The vacuum in the inner bore accelerates the collapsing process and it produces additional, inwardly directed forces during collapsing, so that incidental variations arising in other process parameters, which might lead to an undefined collapsing process, are compensated. In this respect a vacuum in the inner bore contributes to an improved reproducibility of the method.

It has turned out to be particularly advantageous when the pressure in the inner bore is increased in the drawing end phase.

The negative pressure during the drawing phase can already accomplish a complete closing of the inner bore in a drawing bulb portion located at a higher level, especially in the case of a small inner diameter or in the case of a narrow annular gap. In this case the separation plane would have to be chosen in an upper portion of the drawing bulb, with the proviso of a still open inner bore, and with the consequence that a large part of the drawing bulb would arise as loss of material, and that the constriction of the inner bore would turn out to be useless or mechanically weak because of the insignificant taper.

Due to a rise in pressure shortly before the end of the elongation process, the inner bore is expanded, so that a complete collapsing of the inner bore is delayed. As a consequence, the separation plane, on condition of a still open inner bore, can be displaced into a drawing bulb portion located at a level as low as possible, whereby the loss of material is reduced for the subsequent elongation process due to an improved "tip-shaping", and a support of enhanced stability is obtained for the core rod.

In this respect it has turned out to be advantageous when the pressure in the inner bore in the drawing end phase is raised to a value in the range of the ambient pressure+/−50 mbar.

The effect aimed at by the rise in pressure, which has the above-mentioned advantages, is all the more pronounced the higher the pressure is that has been chosen in the inner bore. The above-mentioned upper limit of 50 mbar above the ambient pressure (in the furnace) is determined by the risk of inflation of the hollow cylinder at even higher pressures.

It has turned out to be advantageous when a plunger is inserted into the inner bore above the core rod, the plunger having a smaller outer diameter than the core rod.

The plunger projects from above into the inner bore and presses against the core rod, thereby preventing a floating of the core rod (or of core rod pieces). This means an upward movement of the core rod in a direction opposite to the drawing direction. Floating may occur when the core rod has a small residual weight and play in upward direction. The effect results in a relative lack of core rod material in the drawing bulb and, accompanied by this, to a change in the core/jacket ratio" of the withdrawn component.

The core rod rests via the plunger or further intermediate pieces on an abutment which prevents an upward movement. According to the invention the plunger has an outer diameter which is smaller than the outer diameter of the core rod, so that an annular gap is obtained in the area of the plunger relative to the inner wall of the inner bore, the annular gap being broader than the annular gap in the area of the core rod. This has the consequence that a complete collapsing of the broader annular gap far into the drawing bulb is prevented, resulting in a separation plane located at a very low level and showing a correspondingly small loss of material.

Preferably, the upper end of the core rod extends into the inner bore of the upper hollow cylinder.

The displacement produced thereby between the ends of the two hollow cylinders and the core rod permits a smaller constructional height of the furnace in the above-mentioned quasi continuous mode of operation, for the upper hollow cylinder is obtained in a shortened form as a "half-cylinder" after separation from the optical component, so that the composite of "half-cylinder" and new upper cylinder welded thereto has a smaller length than two hollow cylinders having the same length. It is not necessary that the core rod or the hollow cylinders should have the same length; the method of the invention also permits the use of residual pieces of said components.

Ideally, the upper end of the core rod extends down into the region of half the length of the upper hollow cylinder.

A core rod is here used that has about the same length as the upper hollow cylinder, whereas the lower hollow cylinder is shortened by half its length. The length of the drawing furnace required for carrying out the elongation process can thereby be shortened by half a hollow cylinder length. The elongation process will end as soon as the drawing bulb has reached the upper end of the core rod and an appropriate constriction of the inner bore has formed above the core rod. The half-piece of the hollow cylinder produced in this way is provided at its lower end with the constriction of the inner bore and is used in the subsequent elongation process as the lower hollow cylinder by being fused with a complete upper hollow cylinder on the joint and by being equipped with a core rod that extends up to half the upper hollow cylinder. This process is repeated as often as desired.

It has turned out to be advantageous when the inner diameter and/or the outer diameter of the upper hollow cylinder and/or the lower hollow cylinder is beveled.

The bevel counteracts the formation of inner beads and outer beads, respectively, during welding of upper and lower hollow cylinder. An inner bead would impede the insertion of the core rod or of a possible further jacket tube; an outer bead influences the gas flow in the drawing furnace in an undesired manner. It is enough when one of the two hollow cylinders to be welded has a corresponding bevel in the area of the joint.

Ideally, the radial dimensions of first and second hollow cylinder are the same. Acceptable results will be achieved if the inner diameters of upper hollow cylinder and lower hollow cylinder differ by not more than +/−2 mm, and the outer diameters of upper hollow cylinder and lower hollow cylinder by not more than +/−3 mm from each other.

The first hollow cylinder may be a quartz glass tube having an inner bore produced without any tools during fusion. Preferably, however, the inner bore of the first upper hollow cylinder is mechanically machined to a final dimension.

Thanks to mechanical machining, which particularly includes drilling and grinding, and optionally honing, using known grinding methods and commercial apparatus suited therefor, it is possible to make a quartz glass blank having an outer diameter of more than 100 mm and a length of more than 2 m completely into a straight hollow cylinder having an exact circular cross-section and a small dimensional deviation, in the range of 1/10 mm.

A hollow cylinder which is mechanically machined to a final dimension within the meaning of the present invention is also a cylinder the inner surface of which has been mechanically machined to a final dimension and which has subsequently been cleaned by etching. Uniform etching processes do not significantly change the geometrical end shape of the hollow cylinder (such as a bend or ovality in the cross section).

Figure 2:
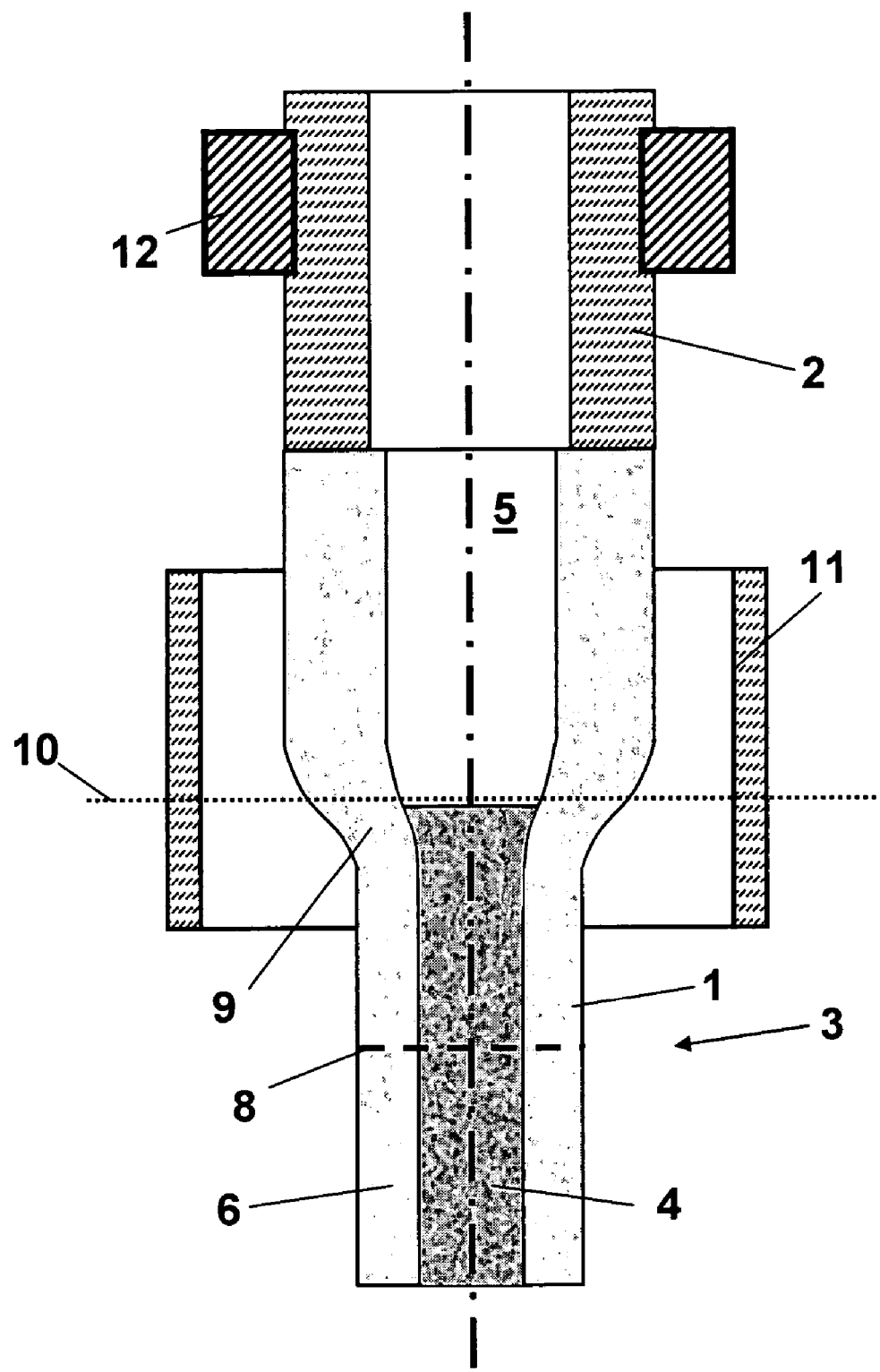
Figure 3:
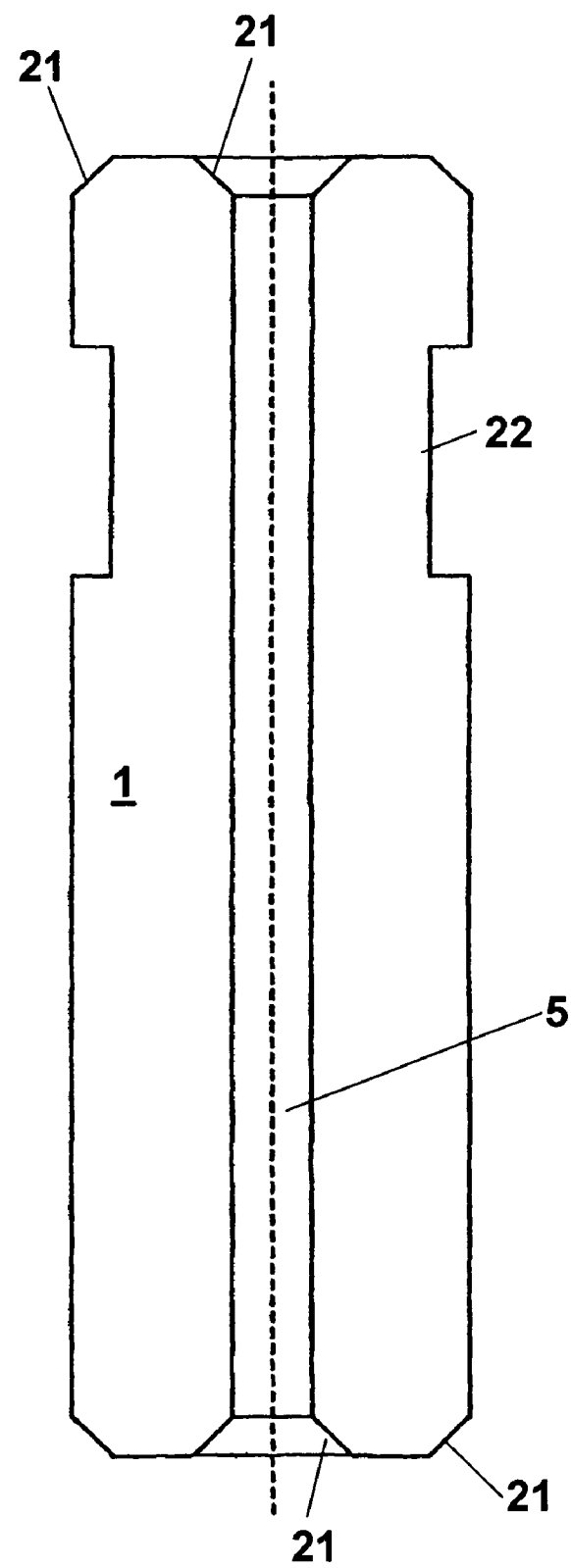
Figure 4:
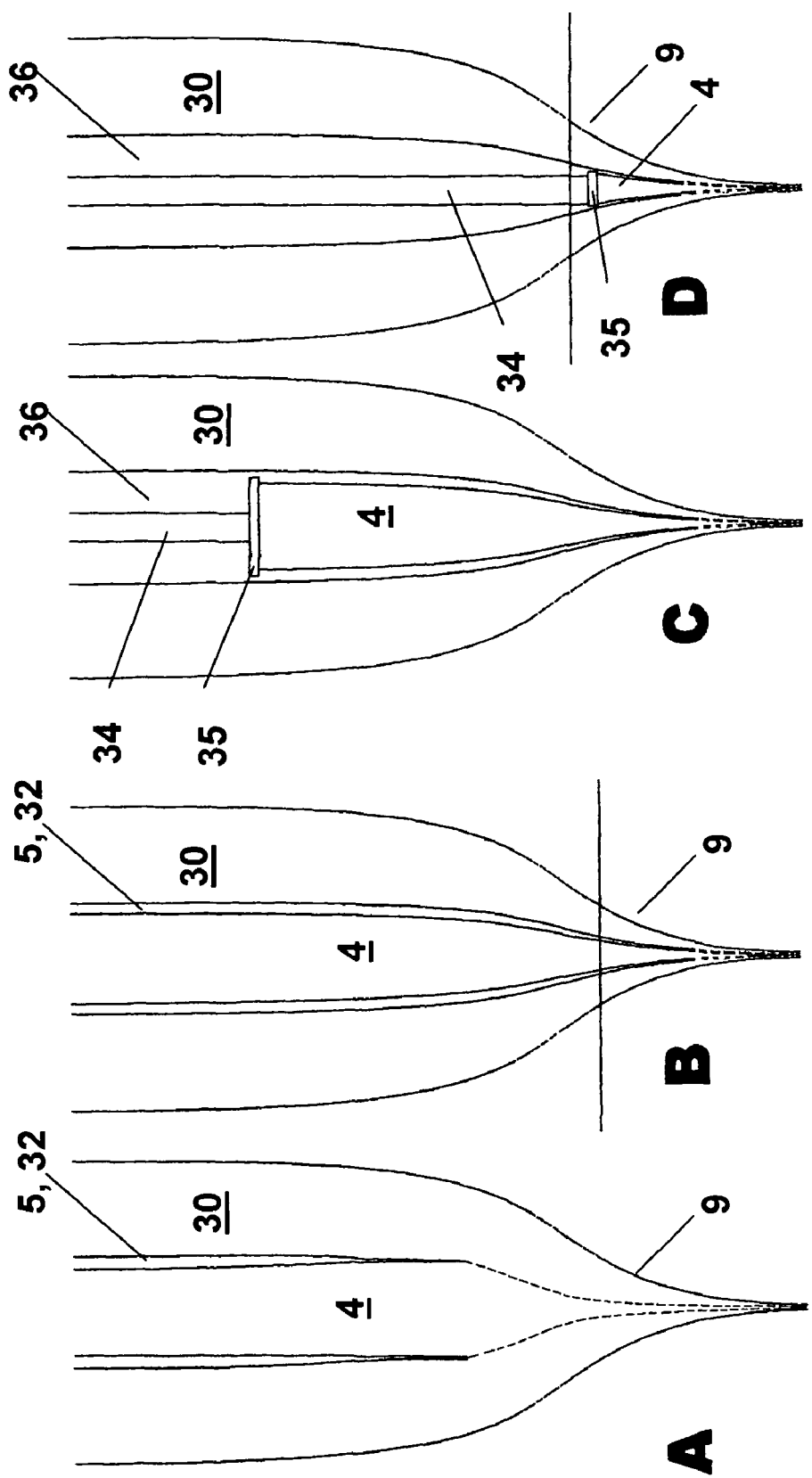

The method according to the invention shall now be explained in more detail with reference to embodiments and a drawing, which is a schematic illustration showing in detail in FIG. 1: a method step for producing a constriction at the end of a hollow cylinder of quartz glass by elongation of an axial composite consisting of upper and lower hollow cylinder in a first embodiment;

FIG. 2: a method step for producing a constriction at the end of a hollow cylinder of quartz glass by elongation of an axial composite consisting of upper and lower hollow cylinder in a second embodiment;

FIG. 3: a hollow cylinder suited for producing the composite according to FIGS. 1 and 2, in a longitudinal section; and FIG. 4: views on the drawing bulb for illustrating various variants of the collapsing process of the inner bore and the selection of a suitable separation plane.

The hollow cylinders, which will be described in more detail hereinafter, are used for producing optical fibers, each having a core region which is surrounded by an inner cladding glass layer and an outer cladding glass layer. The core region consists of quartz glass which is homogeneously doped with 5% by wt. of germanium oxide. The two cladding glass layers consist of undoped quartz glass, the quartz glass for the outer one of the cladding glass layers being provided by the respective hollow cylinder.

First of all, a so-called core rod is produced according to the OVD method. To this end soot particles are deposited layerwise on a carrier rotating about its longitudinal axis by reciprocating a deposition burner, the deposition burner being supplied with $SiCl_4$ and $GeCl_4$ which are hydrolyzed in a burner flame in the presence of oxygen to obtain $SiO_2$ and $GeO_2$. The ratio of $SiCl_4$ and $GeCl_4$ is adjusted during deposition of the inner layers such that a predetermined homogeneous $GeO_2$ concentration of 5 mol % is obtained over this part of the wall thickness of the soot tube. As soon as the soot layers forming the core region of the core rod have been deposited, the supply of $GeCl_4$ to the deposition burner is stopped and an inner cladding glass layer of undoped $SiO_2$ is deposited.

After completion of the deposition method and removal of the carrier a soot tube is obtained which is subjected to a dehydration treatment for removing the hydroxyl groups introduced due to the manufacturing process. To this end the soot tube is introduced in vertical orientation into a dehydration furnace and is first treated at a temperature ranging from 800° C. to 1000° C. in a chlorine-containing atmosphere. The treatment lasts for about eight hours. This yields a hydroxyl group concentration of less than 100 wt ppb.

The soot tube treated in this way is vitrified in a vitrification furnace at a temperature in the range of about 1350° C. and the inner bore is collapsed in this process, resulting in a core rod having an outer diameter of 38 mm and the desired refractive index profile. Depending on the length, the weight of the core rod is up to 6 kg. In the optical fiber to be produced with an outer diameter of 125 μm, the core glass of the core rod forms a core region having a diameter of about 8.5 μm.

As an alternative to the above-described manufacturing method of the core rods according to the OVD method, said rods are produced according to the known MCVD, VAD, FCVD (furnace CVD) or PCVD method.

At any rate, further cladding material is provided for forming the outer cladding glass layer in the form of the one hollow cylinder, said material being collapsed onto the core rod during fiber drawing in an ODD method. The hollow cylinder is produced by analogy with the above-described production of the core rod with the help of a standard OVD method, but without addition of a dopant. After removal of the carrier a soot tube is obtained which is subjected to the above-described dehydration method and is subsequently vitrified.

The outer wall of the resulting quartz glass blank is ground by way of peripheral infeed grinding or longitudinal grinding in several operations with use of successively finer grain sizes to the desired outer dimension. Likewise, the inner bore is drilled by a drill and reworked by honing for the purpose of a high-precision finishing treatment with respect to shape and surface quality. This yields a straight bore extending in the direction of the longitudinal axis and having an exactly circular cross-section. To reduce surface tensions and to remove damage caused by surface treatment, the quartz glass tube is etched in a hydrofluoric acid bath for a short period of time, the HF concentration of said bath ranging from 5% to 30%.

The resulting hollow-cylinder blank has an outer diameter of 180 mm, an inner diameter of 42 mm, and a length of 2500 mm. The dimensional deviation ($t_{max}$-$t_{min}$) in the wall thickness is 0.5 mm. It is used, possibly after having been cut to length, as a hollow cylinder within the meaning of the present invention for producing preforms for optical fibers or for producing optical fibers with the help of an ODD method.

To this end a coaxial arrangement of core rod and hollow cylinder is supplied in vertical orientation to a heating zone and is softened therein zonewise, starting with the lower end, in an annular furnace to a temperature around 2050° C. and an optical fiber is drawn from the softened region in this process. At the beginning of the drawing method the core rod is supported on a constriction of the hollow cylinder. The generation of a suitable constriction will now be explained in more detail with reference to FIG. 1.

FIG. 1 is a schematic illustration showing the creation of a constriction of the inner bore 5 of a hollow cylinder 1. Said cylinder is first fused with formation of an axial composite 3 at the front side with a second lower hollow cylinder 6 surrounding a core rod 4.

Length, inner diameter and outer diameter of upper and lower hollow cylinder 1, 6 are equal.

The axial cylinder composite 3 produced in this way is supplied, starting with its lower end, in vertical orientation to an annular furnace 11, and is softened therein zonewise and elongated with formation of a preform 8. The upper hollow cylinder 1 is clamped by means of a clamping jaw 12 of a holding device, thereby serving to hold the lower hollow cylinder 6 at the same time.

During elongation a drawing bulb 9 is formed that is gradually progressing to the upper hollow cylinder 1 in the cylinder composite 3 due to the advance movement. In the inner bore 5 an absolute pressure of 1 mbar is maintained during said phase (drawing phase). This negative pressure prevents the core rod 4 from sagging and facilitates and accelerates the collapse of the inner bore 5, or more precisely, the collapse of the annular gap between the lower hollow cylinder 6 and the core rod 4. This enables the inner bore 5 to close already in an upper region of the drawing bulb 9, as is schematically shown in FIG. 4A.

As soon as the drawing bulb 9 has reached the lower end of the upper hollow cylinder 1, its inner bore 5 starts to constrict gradually. In this final phase of the elongation process, the pressure in the inner bore 5 is increased to 10 mbar above the ambient pressure (1 atm) to delay the closing of the inner bore and to maintain an opening of the inner bore 5 into the lower area of the drawing bulb 9 despite the narrowing outer diameter, as shown with reference to FIG. 4B.

The elongation process is thereupon completed and the upper hollow cylinder 1 is separated from the preform 8 in a separation plane which is outlined by the dotted line 10, and which also corresponds approximately to the weld of the two hollow cylinders 1, 6.

The inner bore 5 of the hollow cylinder 1 is now provided with a constriction which is suited for holding a core rod in a subsequent elongation process. The upper hollow cylinder 1 is thus equipped with a new core rod and fused with its upper open front side with a further hollow cylinder which in the subsequent elongation process serves to hold the hollow cylinder 1 and in which, as has been described above, a constriction of the inner bore is now created in the elongation process for producing a preform.

FIG. 2 schematically shows a modification of the method described with reference to FIG. 1, identical reference numerals designating identical or equivalent components or constituents, as have been explained above in more detail with reference to FIG. 1 for the corresponding reference numerals.

In this modification of the method, the lower hollow cylinder 6 has an initial length of 125 cm; the upper hollow cylinder 1 which is welded thereto ha a length of 250 cm, just like the core rod 4. The weld between upper and lower hollow cylinders is marked by the dashed line 8. Thus the core rod 4 extends approximately 125 cm into the inner bore 5 of the upper hollow cylinder 1.

As a result, the overall length of the hollow cylinder composite 3 is 125 cm shorter than in the procedure explained with reference to FIG. 1. The elongation process will be completed as soon as the drawing bulb 9 has reached the upper end of the core rod 4 and an appropriate constriction of the inner bore 5 has been formed in the upper hollow cylinder 1 above the core rod 4. The half-piece of the hollow cylinder produced in this way is provided at its lower end with the constriction of the inner bore and is used in the subsequent elongation process as the lower hollow cylinder by being fused on the joint with a complete upper hollow cylinder and by being equipped with a core rod which extends up to the half of the upper hollow cylinder. This process is repeated as often as desired.

The shorter overall length of the hollow cylinder composite 3 permits a more compact construction of the drawing furnace or the use of a dummy holding cylinder 2, which is welded to the upper end of the upper hollow cylinder 1 and engaged by clamping jaws 12 of a holding device which serves to hold both hollow cylinders 1, 6 in the furnace, as schematically shown in FIG. 2.

The welding of the two hollow cylinders on the joint is accomplished in an optimum manner if the outer diameter and the inner diameter are beveled in the case of at least one of the hollow cylinders, as schematically illustrated in FIG. 3.

A linear bevel 21 of the inner diameter and of the outer diameter is created at both front sides of the hollow cylinder 1, the bevel having a width of 10 mm in both the circumferential direction and the longitudinal direction. For improving the mounting of the hollow cylinder 1 by means of the clamping jaws 12 (FIG. 1, FIG. 2), a recess 22 with a depth of 2 mm is provided at the upper end, the quality of the withdrawn component being not noticeably impaired by said recess.

Due to the bevel the formation of inner and outer beads is counteracted during front-sided welding of upper and lower hollow cylinder. For welding purposes the edge portions of the front sides of the two hollow cylinders, said front sides facing the weld, are heated by means of a propane gas burner and softened for a period of about 20 minutes, and the softened ends are then pressed against each other.

FIG. 4 shows various views on the drawing bulb in the area of the weld of upper and lower cylinder prior to separation. The hollow cylinder is here designated by reference numeral 30 each time.

FIG. 4A shows the early closing of the inner bore 5 or annular gap 32 in the elongation process in the case where a vacuum (absolute pressure 1 mbar) is produced in the inner bore 5, 32 (drawing phase).

Attention must be paid that after separation of the upper hollow cylinder 30 from the preform a downwardly open inner bore is desired (despite the constriction) for the purpose of an efficient cleaning of the hollow cylinder before the subsequent elongation step. Moreover, an open inner bore also permits gas flushing before the beginning of the elongation process.

In the case shown in FIG. 4A, a separation plane that would yield a downwardly open inner bore would have to be drawn in the upper region of the drawing bulb 9, with the consequence that almost the whole mass of the drawing bulb would have to be rejected as loss of material.

FIG. 4B shows a variant for solving this problem by expanding the annular gap 32 by increasing the pressure in the inner bore 5 or in the annular gap 32 to approximately the ambient pressure (+10 mbar). The annular gap 32 thereby extends far into the drawing bulb 9, so that even a separation plane 9 to be drawn at a very low level on the drawing bulb 9 will still yield a downwardly open inner bore 5.

FIGS. 4C and 4D show a modification of the method schematically illustrated in FIG. 1 and FIGS. 4A and 4B, a holding rod 34 being used which is meant to prevent a floating of the core rod 4 especially in the last phase of the elongation process. To this end the holding rod 34 rests with its lower end via an intermediate plate 35 on the core rod 4 while its upper end rests on an abutment (not shown in FIG. 1).

The outer diameter of the holding rod 34 is with its 10 mm much smaller than the inner diameter of the inner bore 5, resulting in a wide annular gap 36 between the inner wall of the hollow cylinder and the holding rod 34. Due to its large width the annular gap 36 collapses also under vacuum rather late, thus extending far into the drawing bulb 9. Therefore, a separation plane 10 to be drawn at a very low level on the drawing bulb 9 will still yield a downwardly open inner bore 5 in this case as well—without a change in pressure in the inner bore 5.

The invention claimed is:

1. A method for producing an optical component of quartz glass, said method comprising:

elongating a first coaxial arrangement of a first core rod and a hollow cylinder structure of a predetermined length, wherein the first coaxial arrangement is supplied in vertical orientation to a heating zone and is softened therein zonewise, starting with a lower end thereof, and the component is drawn off downwards from a softened region, the hollow cylinder structure having an inner bore therein, and in a region of the lower end being provided with a constriction in the inner bore on which the first core rod is supported, wherein a) a first upper hollow cylinder is fused at an end thereof with a second lower hollow cylinder so as to form the hollow cylinder structure as an axial cylinder composite,
   b) the first core rod is introduced into the lower hollow cylinder and the axial cylinder composite is supplied to the heating zone, starting with a lower end thereof, and is softened therein zonewise and elongated so as to form the optical component,
   c) a drawing bulb being formed as said axial cylinder composite is softened and elongated, said drawing bulb progressing in the cylinder composite to the first upper hollow cylinder, wherein, within said drawing bulb, the inner bore is collapsed at least in part, so as to produce a second constriction of the inner bore,
   d) the first upper hollow cylinder is separated at a separation plane in an area of the second constriction therein from the optical component so that the separated first upper hollow cylinder has the second constriction at an end thereof, and
   e) the first upper hollow cylinder is subsequently combined with a second core rod supported on the second constriction in a second coaxial arrangement, and the second coaxial arrangement is elongated so as to produce a second optical component.

2. The method according to claim 1, wherein the first upper hollow cylinder is subsequently used as a second lower hollow cylinder in a second axial cylinder composite.

3. The method according to claim 2, wherein the second constriction in an area of the separation plane has an axially continuous opening.

4. The method according to claim 2, wherein an upper end of the first core rod extends into the inner bore of the first upper hollow cylinder.

5. The method according to claim 2, wherein the first upper hollow cylinder and/or the second lower hollow cylinder of the axial cylinder composite has an inner diameter and/or an outer diameter that is beveled.

6. The method according to claim 1, wherein the first upper hollow cylinder is used in the elongation process for holding the second lower hollow cylinder.

7. The method according to claim 6, wherein the second constriction in an area of the separation plane has an axially continuous opening.

8. The method according to claim 6, wherein an upper end of the first core rod extends into the inner bore of the first upper hollow cylinder.

9. The method according to claim 6, wherein the first upper hollow cylinder and/or the second lower hollow cylinder has an inner diameter and/or an outer diameter that is beveled.

10. The method according to claim 1 wherein the second constriction in the area of the separation plane has an axially continuous opening.

11. The method according to claim 10, wherein an upper end of the first core rod extends into the inner bore of the first upper hollow cylinder.

12. The method according to claim 10, wherein the first upper hollow cylinder and/or the second lower hollow cylinder has an inner diameter and/or an outer diameter that is beveled.

13. The method according to claim 1 wherein the elongation process comprises a drawing phase and a drawing end phase, and wherein during the drawing phase a negative pressure is produced in the inner bore relative to an externally applied pressure.

14. The method according to claim 13, wherein the pressure in the inner bore is increased in the drawing end phase.

15. The method according to claim 14, wherein the pressure in the inner bore is increased in the drawing end phase to a value in the range of an ambient pressure+/−50 mbar.

16. The method according to claim 1, wherein a plunger which has a smaller outer diameter than the first core rod is used in the inner bore above the first core rod.

17. The method according to claim 1 wherein an upper end of the first core rod extends into the inner bore of the upper hollow cylinder.

18. The method according to claim 17, wherein the upper end of the first core rod extends up and into a region of half the length of the first upper hollow cylinder.

19. The method according to claim 1 wherein at least one of the first upper hollow cylinder and the second lower hollow cylinder has at least one of a beveled inner diameter and a beveled outer diameter.

20. The method according to claim 1 wherein the first upper hollow cylinder and second lower hollow cylinder have inner diameters that differ by not more than +/−2 mm from each other, and the first upper hollow cylinder and second lower hollow cylinder have outer diameters that differ by not more than +/−3 mm from each other.

21. The method according to claim 1 wherein the inner bore of the first upper hollow cylinder is mechanically machined to a final dimension.

* * * * *